United States Patent [19]
Bunce et al.

[11] Patent Number: 5,598,007
[45] Date of Patent: Jan. 28, 1997

[54] SYMBOLOGY READER WITH FIXED FOCUS SPOTTER BEAM

[75] Inventors: Steven M. Bunce, Mill Creek; Joel T. Aragon, Everett, both of Wash.

[73] Assignee: Intermec Corporation, Everett, Wash.

[21] Appl. No.: 215,202

[22] Filed: Mar. 21, 1994

[51] Int. Cl.⁶ ..................................... G06K 7/10
[52] U.S. Cl. .................... 250/566; 250/568; 235/462; 235/463; 235/472
[58] Field of Search .................... 250/566, 568, 250/227.13; 235/462, 463, 472

[56] References Cited

U.S. PATENT DOCUMENTS

| | | | |
|---|---|---|---|
| 4,743,773 | 5/1988 | Katana et al. | 250/566 |
| 4,760,248 | 7/1988 | Swartz et al. . | |
| 4,874,936 | 10/1989 | Chandler et al. . | |
| 4,877,949 | 10/1989 | Danielson et al. | 235/462 |
| 4,896,029 | 1/1990 | Chandler et al. | 235/494 |
| 4,988,852 | 1/1991 | Krishnan | 235/462 |
| 4,998,010 | 3/1991 | Chandler et al. | 235/494 |
| 5,019,699 | 5/1991 | Kosack | 235/472 |
| 5,075,538 | 12/1991 | Swartz et al. . | |
| 5,124,537 | 6/1992 | Chandler et al. | 235/462 |
| 5,146,463 | 9/1992 | Rando . | |
| 5,155,343 | 10/1992 | Chandler et al. | 235/462 |
| 5,189,292 | 2/1993 | Batterman et al. | 235/494 |
| 5,241,166 | 8/1993 | Chandler | 235/494 |
| 5,254,853 | 10/1993 | Reich | 250/221 |
| 5,272,353 | 12/1993 | Barkan et al. . | |
| 5,278,397 | 1/1994 | Barkan et al. | 235/462 |
| 5,291,028 | 3/1994 | Droge et al. . | |
| 5,296,689 | 3/1994 | Reddersen et al. . | |
| 5,331,176 | 7/1994 | Sant'Anselno et al. | 250/566 |
| 5,347,121 | 9/1994 | Rudeen . | |
| 5,491,346 | 2/1996 | Sussmeier | 250/568 |
| 5,504,367 | 4/1996 | Arackellian | 235/472 |

FOREIGN PATENT DOCUMENTS

| | | | |
|---|---|---|---|
| 0450878A1 | 10/1991 | European Pat. Off. | G06K 7/10 |
| 0449634A2 | 10/1991 | European Pat. Off. | G06K 7/10 |
| 0524029A2 | 1/1993 | European Pat. Off. | G06K 7/10 |
| 63-67692A | 3/1988 | Japan | G06K 7/10 |

*Primary Examiner*—Georgia Y. Epps
*Assistant Examiner*—Ricky Mack
*Attorney, Agent, or Firm*—Seed and Berry LLP

[57] ABSTRACT

A symbology reader having a pair of optical sources for producing cursor beams. The cursor beams are emitted from two spaced apart locations on the reader and angled with respect to an image direction of a detector assembly within the reader. The cursor beams intersect at a desired object distance to form a composite image indicating that the reader is positioned an appropriate distance from a target object. In one embodiment, multiple composite images are formed. The composite images are spaced apart to delineate the extent of an object field of the detector assembly. In one embodiment, the optical sources are LEDs concealed beneath a mounting platform and emitting light transversely to the image direction. In this embodiment, turning mirrors redirect the light forward of the reader to form the cursor beams.

33 Claims, 8 Drawing Sheets

SYMBOLOGY READER WITH FIXED FOCUS SPOTTER BEAM

TECHNICAL FIELD

This invention relates to spotting beams for targeting optical symbology readers.

BACKGROUND OF THE INVENTION

Area-type symbology readers typically utilize flash optics similar to the flash optics of a conventional camera. In such readers, a target object is illuminated briefly, during which time the reader produces a digital image of light incident upon an optical detector assembly from its object field. If a target object is positioned within the object field, the detector assembly receives light reflected from the region of the target object positioned in the object field. The digital image is a representation of the reflectance of that region of the target object.

If the reader is not aligned with the target object so that a symbology such as a bar code or other coded symbology on the target object is within the object field, the symbology cannot be read effectively. Therefore, a significant consideration in the use of such readers is the positioning of the reader so that the object field of the detector assembly is in alignment with the symbology on the target object to be read.

Because the illuminating light source is typically not activated at times other than during a flash, this light source provides no prior visible indication of the location of the object field on the target object. As such, the user must guess at the proper alignment of the reader with the target object in order to align the object field with the symbology on the target object to be read. Even if the illuminating light source were to be activated, it would provide little help in orienting the reader, as light is emitted from typical illuminating sources across a wide angular range.

The use of a spotter beam to indicate the general position of the object field for a detector array is known from European Patent Application EPA 0524029A2 to Chandler et al. In such a system, the spotter beam simply provides a single spot indicating roughly the center of the object field to aid in the proper alignment of the reader with the symbology.

An additional concern with readers is the positioning of the detector array at a proper distance from the symbology to be read. Detector assemblies typically employ detector arrays and imaging optics and have an object distance at which their operation, in conjunction with any additional optical elements used in the reader, are most effective. Thus, it is desirable to position the reader at a distance from the target object such that the detector assembly is approximately at the desired object distance from the symbology. Once again, in the absence of a visual aid, a user must make a guess as to the appropriate positioning of the reader with respect to the target object.

The device of Chandler does not provide an aid to a user in positioning the reader at the desired object distance. Instead, the distance from the reader to the target object is determined by capturing the image of the spotter beam and performing calculations with a controller. Upon determining the distance between the reader and the target object, the device adjusts the focal length setting of its imaging optics to adjust the effective object distance of the detector assembly. Such a system requires an adjustable optical imaging system. It also utilizes valuable controller capacity to perform distance calculations.

It is also desirable to provide the user of the reader with an indication of the extent of the object field. As used here, the object field is the region of the object plane imaged by the detector assembly. In that manner, the user will know whether or not the symbology to be read is fully within the object field. When the user knows that the reader has its object field properly aligned with the symbology, the symbology fully within the object field and the detector assembly at the desired object distance from the symbology, the illuminating light source can be activated to generate a flash of light to illuminate the symbology and produce a high quality digital image from the detector assembly.

SUMMARY OF THE INVENTION

A symbology reader for reading a symbology on a target object, the symbology having a plurality of areas of different reflectance is described. The reader includes an optical detector assembly having an optical axis and detecting light reflected from the target object positioned along the optical axis. The reader is movable toward and away from the target object along the optical axis to change the distance between the detector assembly and the target object. The detector assembly has a selected object distance from the detector assembly for reading the symbology. The symbology reader also includes a first light source producing a visible first cursor beam directed along a first optical path in non-parallel angular orientation relative to the optical axis and directed toward the target object at or proximate the symbology. The first cursor beam forms a first cursor image on the target object having a first predetermined shape. The reader also includes a second light source producing a visible second cursor beam directed along a second optical path different from the first optical path and directed toward the target object at or proximate the symbology. The second light source is positioned laterally offset from the first light source. The second cursor beam forms a second cursor image on the target object having a second predetermined shape. The first and second optical paths are selected such that when the reader is moved to position the detector assembly with respect to the target object at the selected object distance from the detector assembly, the first and second cursor images form a visibly recognizable composite image on the target object indicative of the positioning of the detector assembly with the target object at the selected object distance. When the reader is moved to position the detector assembly at a position other than the selected object distance, the composite image is not formed on the target object.

In one embodiment, the symbology reader includes a reader housing where the first and second light sources are LEDs mounted to the reader housing. The reader also includes first and second beam shaping optical elements which shape the first and the second cursor beams, respectively, to form the first and second cursor images of the first and second predetermined shapes. In one embodiment, the first and second predetermined shapes are geometric shapes. In one embodiment, the beam shaping optical elements are opaque elements having apertures therethrough. The apertures are defined by sidewalls corresponding to the first and second predetermined shapes.

In one embodiment, the first and second optical paths are selected such that the composite image is formed from the first cursor image overlapping the second cursor image. In another embodiment, the first and second optical paths are chosen such that the composite image is formed from the first cursor image touching the second cursor image.

In one alternative embodiment, the first and second light sources are oriented to produce respective visible first and second cursor beams in a plane substantially transverse to the optical axis. A first turning mirror is positioned to redirect the first cursor beam along a first optical path with a non-parallel angular orientation relative to the optical axis and is directed toward the target object at or proximate the symbology. A second turning mirror is positioned to redirect the second cursor beam along a second optical path different from the first optical path and directed toward the target object at or proximate the symbology. The second turning mirror is laterally offset from the first turning mirror. The first and second optical paths are selected such that when the reader is moved to position the detector assembly with the target object at the selected object distance from the detector assembly the first and second cursor images form a visibly recognizable composite image on a target object.

This embodiment of the reader includes a mounting platform having first and second apertures therethrough, wherein the detector assembly is mounted at a forward side of the mounting platform toward the target object and the first and second light sources and the first and second turning mirrors are mounted on a rearward side of the platform, with the first and second turning mirrors oriented to direct the first and second cursor beams through the first and second apertures, respectively. The mounting platform is mounted within the reader housing.

In one embodiment, a first light source produces first and second cursor beams of visible light. The first and second cursor beams are directed along first and second optical paths, respectively, toward the target object to form first and second cursor images, respectively, on the target object. The first and second optical paths are in non-parallel orientation relative to each other such that the first and second cursor images form a visually recognizable first composite image on the target object only when the reader is moved to position the detector assembly with the target object at the selected object distance from the detector assembly. This embodiment includes a second light source producing third and fourth cursor beams of visible light, where the third and fourth cursor beams are directed along third and fourth optical paths, respectively, toward the target object to form third and fourth cursor image, respectively, on the target object. The third and fourth optical paths are in non-parallel orientation relative to each other such that the third and fourth cursor images form a visually recognizable second composite image on the target object only when the reader is moved to position the detector assembly with the target object at the selected object distance from the detector assembly.

In one embodiment, the first and second optical paths are directed to form the first composite image at a first perimeter location of the object field of the detector assembly when the target object is at the object distance from the detector assembly. The third and fourth optical paths are directed to form the second composite image at a second perimeter location of the object field of the detector assembly, spaced apart from the first perimeter location. The first and second composite images can be used to guide aligning movement of the symbology reader to position the object field of the detector assembly in alignment with the symbology on the target object for reading of the symbology. The object field of the detector assembly is substantially rectangular in shape and the first and second optical paths are directed such that the first perimeter location of the object field at which the first composite image is formed is a first corner of the object field. The third and fourth optical paths are directed such that the second perimeter location of the object field at which the second composite image is formed is a second corner of the object field, diagonally located from the first corner of the object field. The first corner of the object field is defined by first and second transversely oriented perimeter boundaries and the second corner of the object field is defined by third and fourth transversely oriented perimeter boundaries. The embodiment includes a first beam shaping optical element shaping the first cursor beam to have a predetermined first cross-sectional shape so as to form the first cursor image in substantial alignment with the first perimeter boundary of the object field forming the first corner thereof. A second beam shaping optical element shapes the second cursor beam to have a predetermined second cross-sectional shape so as to form the second cursor image in substantial alignment with the second perimeter boundary. A third beam shaping optical element shapes the third cursor beam to have a predetermined third cross-sectional shape so as to form the third cursor image in substantial alignment with the third perimeter boundary of the object field. A fourth beam shaping optical element shapes the fourth cursor beam to have a predetermined fourth cross-sectional shape so as to form the fourth cursor image in substantial alignment with the fourth perimeter boundary of the object field.

In an alternative embodiment, the reader includes a light source producing a visible cursor beam directed along a first optical path in non-parallel angular orientation relative to the optical axis and directed toward the target object at or proximate the symbology. The first cursor beam strikes the target object and is reflected therefrom. The reader includes an optical detector element mounted to the reader and spaced apart from the detector assembly for detecting light from the cursor beam that is reflected from the target object. The optical detector element is positioned such that it receives the light reflected when the cursor beam striking the symbology and does not receive light reflected when the cursor beam strikes other regions of the target object.

In a method according to the invention, a symbology reader having a detector assembly mounted thereto is aligned to a symbology on a target object. The detector assembly has a predetermined object distance and the method comprises the steps of producing visible light with a first optical source. The visible light is formed into a first cursor beam and the first cursor beam is directed along a first optical path toward the target object to form a first cursor image thereon. Visible light is produced with a second source offset from the first optical source. The visible light from the second optical source is formed into a second cursor beam and the second cursor beam is directed along a second optical path toward the target object to form a second cursor image thereon with the second optical path having a non-parallel orientation relative to the first optical path such that the first and second cursor images form a visually recognizable composite image on the target object when the target object is at the selected object distance from the detector assembly. The position of the symbology reader is adjusted with respect to the target object until the first and second cursor images converge to form the composite image to indicate that the detector assembly is at the selected object distance. The first and second optical paths intersect at the selected object distance such that the first and second cursor images form a contiguous composite image on the target object.

Several cursor images are within the scope of the invention. In one embodiment, the first and second cursor images are bars which intersect to form an "X". In another embodiment, the first and second cursor images are a ">" and "<" which together form an "X".

In one embodiment, four cursor beams are formed. Each of the cursor beams is directed along a respective optical path toward the target object to form a respective cursor image thereon. Together, the first and second cursor images form a first composite image and the third and fourth cursor images form a second composite image, thereby indicating that the detector assembly is at the selected object distance from the target object. In one embodiment, the respective cursor images align to the perimeter of an object field of the detector assembly. In another embodiment, the first and second composite images form a composite image at a first corner of the object field and the second composite image is formed at a second corner of the object field diagonally located from the first corner of the object field.

In one embodiment of the method for aligning a symbology reader having a detector assembly and an optical detector mounted thereto to a symbology on a target object, the detector assembly having a predetermined object distance. An optical source produces visible light and the visible light is formed into a cursor beam having a selected beam width. The cursor beam is directed along an optical path toward the target object such that light of the cursor beam is reflected toward the symbology reader and is received by the optical detector only when the symbology reader is at the predetermined object distance from the target object. The position of the symbology reader is adjusted such that the light of the cursor beam reflected from the target object strikes the optical detector.

In another embodiment of the method, the reader has a detector assembly having a predetermined object distance and an optical source. Light is produced with the optical source and formed into a cursor beam having a selected beam width. The cursor beam is directed along an optical path toward the target object such that light of the cursor beam is reflected from the target object toward the symbology reader and is received by the detector assembly only when the symbology reader is at the predetermined object distance from the target object. The position of the symbology reader is then adjusted with respect to the target object until the light of the cursor beam reflected from the target object strikes the detector assembly.

DETAILED DESCRIPTION OF THE INVENTION

Figure 1:
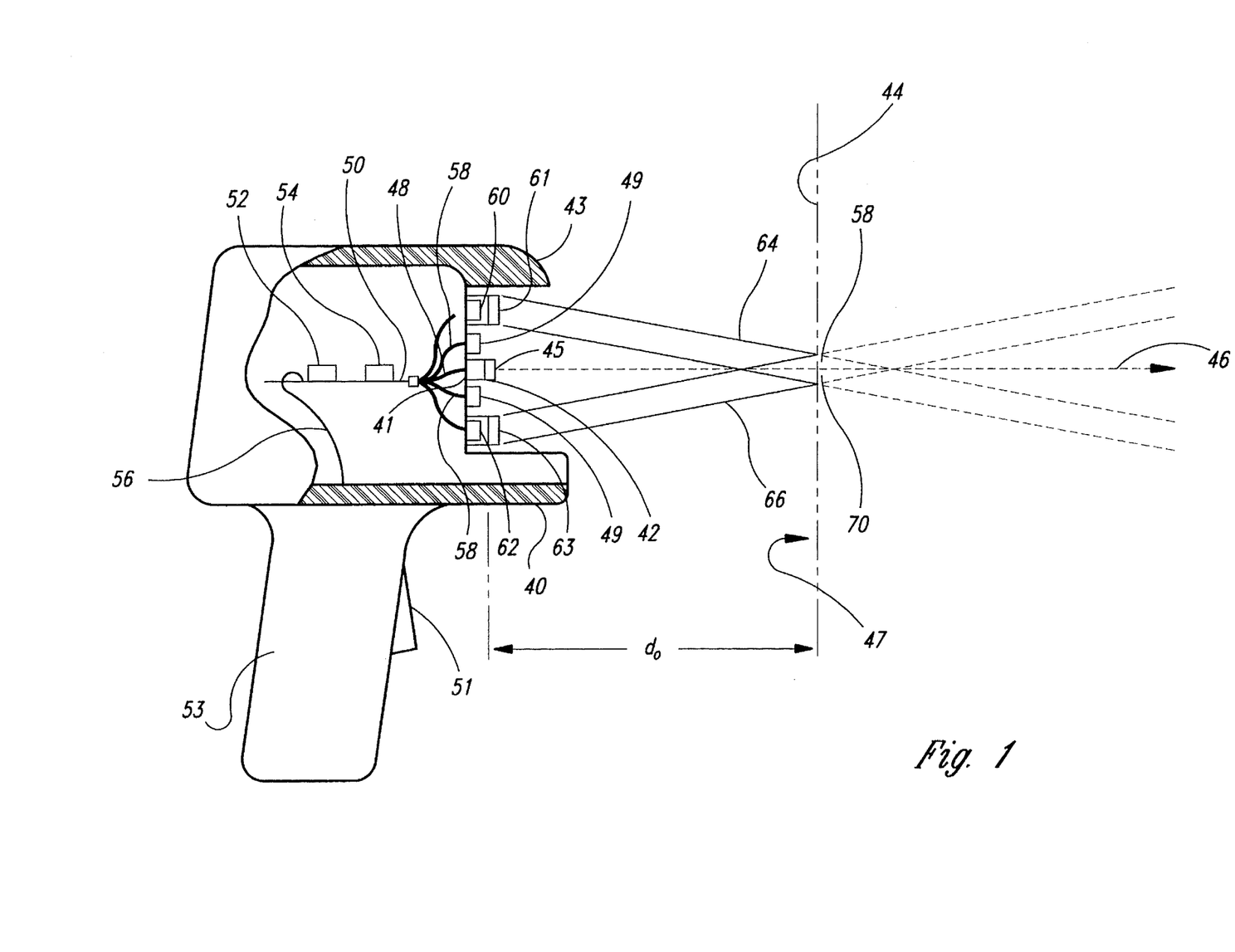
FIG. 1 is a schematic right side, cross-sectional view of a symbology reader according to the present invention.

As shown in FIG. 1, a hand-held symbology reader 40 includes a detector assembly 42 mounted at a forward end 43 of the reader and oriented to receive light incident upon the detector assembly 42 from an object field 47, located along an optical axis 46 at an object distance $d_0$. The detector assembly 42 includes a detector array 45 and imaging optics 41. The incident light includes light reflected from a target object 44 positioned along the optical axis 46 (at a distance from the detector assembly 42). Light for illuminating the target object 44 is produced by illuminating optical sources 49 oriented to emit light from the reader 40 toward the target object 44.

The reader 40 is activated by a user depressing a three-position trigger switch 51 mounted at a handle 53 of the reader 40 and connected to a printed circuit board 50 through a cable 56. In response to actuation of the switch 51, the illuminating optical sources 49 are energized under control of a microprocessor 52 by conventional electronics 54 using cables 58.

Upon receiving incident light reflected from the target object 44, the detector array 45 within the detector assembly 42 generates electrical signals which are transmitted by a cable 48 to the printed circuit board 50 on which the microprocessor 52 and other electronics are mounted. There, the electrical signals from the detector assembly 42 are decoded by the microprocessor 52 in conjunction with the conventional electronics 54.

The illuminating optical sources 49 use flash optics. That is, the illuminating optical sources 49 are activated for a brief period of time, much like the flash illumination in a typical camera. During the period when the illuminating optical sources 49 are activated, electrical signals from the detector assembly 42 are monitored by the microprocessor 52 to produce a digital "image" of light reflected from the target object 44. If a symbology is on the target object 44 in the object field 47 of detector assembly 42, the digital image will be of the read symbology.

As is known, operation of the detector assembly 42 can be optimized for a specific detector-to-target distance referred to herein as the object distance. The detector assembly 42 also has a known depth of field $2d_n$. As used herein, the depth of field is the range over which deviation from the object distance $d_0$ will not substantially degrade the performance of the detector assembly 42. The reader 40 will operate adequately when the target object 44 is positioned closely enough to the object distance $d_0$ to be in the depth of field.

To assist a user in positioning the reader 40 at the desired object distance $d_0$, the reader 40 provides a visible indication to the user when the reader 40 is at the desired object distance $d_0$ using two cursor light sources 60, 62 mounted to the reader 40 at its forward end 43. The cursor light sources 60, 62 are LEDs. Each of the cursor light sources 60, 62 produces a visible cursor beam 64, 66, respectively which are shaped by optical elements 61, 63. The optical elements 61, 63 may include lenses and/or shaped apertures as discussed herein below. The cursor light sources 60, 62, are spaced apart with the detector assembly 42 therebetween and are angularly oriented relative to the optical axis 46 such that the cursor beams 64, 66 intersect at the desired object distance $d_0$. Upon striking the target object 44, the cursor beams 64, 66 produce cursor images 68, 70, respectively, which coincide, as shown in FIG. 3B.

Figure 2:
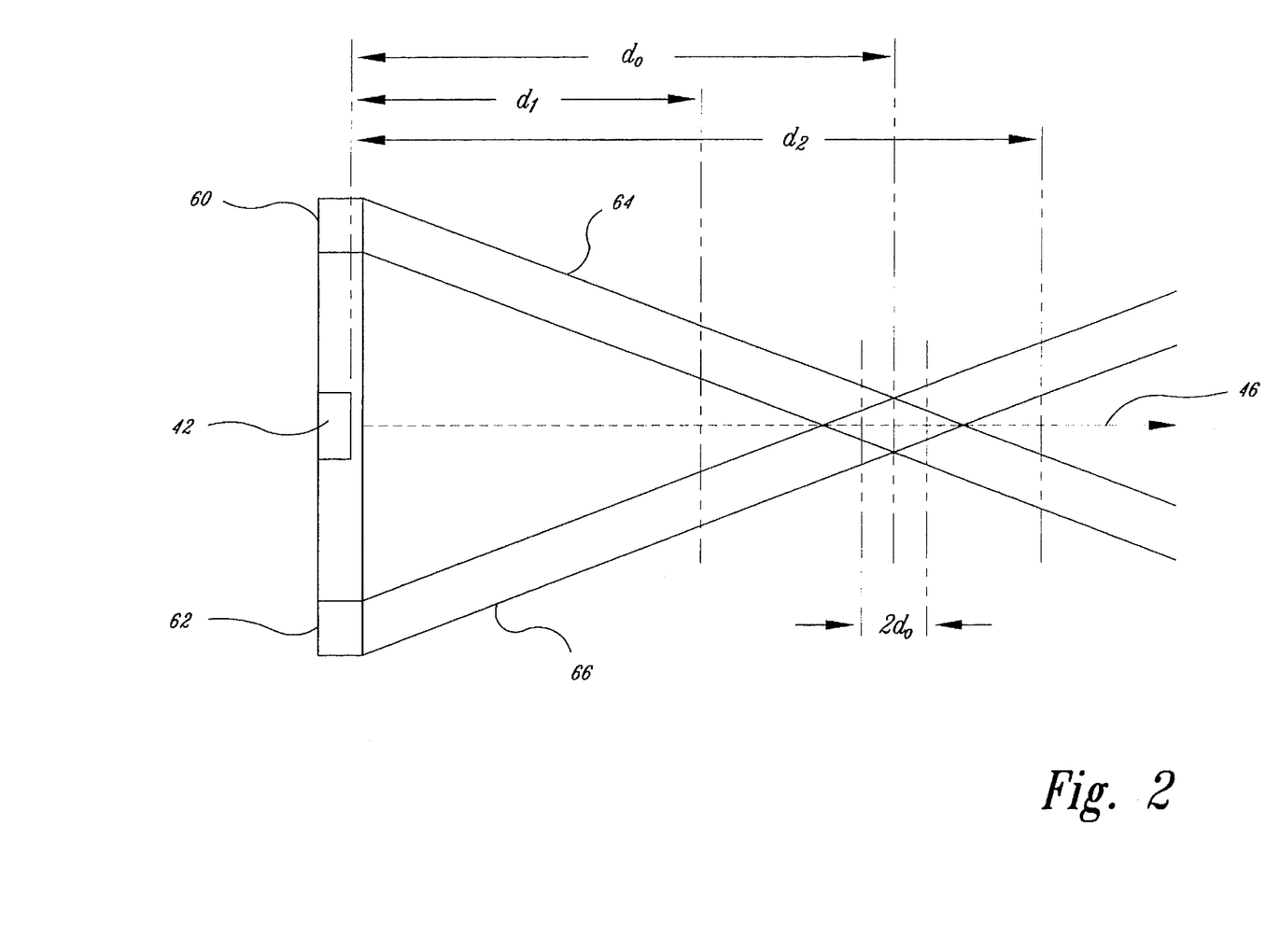
FIG. 2 is a schematic representation of the relative positions of the cursor beams of the reader of FIG. 1.

As represented in greater detail in FIG. 2, the cursor beams 64, 66 intersect the image direction line 46 at the object distance $d_0$. At a distance $d_1$, less than the desired object distance $d_0$, the cursor beam 64 is offset above the optical axis 46 and the cursor beam 66 is offset below the optical axis 46. At a distance $d_2$, greater than the desired object distance $d_0$, the cursor beam 66 has crossed the optical axis 46 and is offset above the detector assembly 42. Similarly, the cursor beam 64 has crossed the optical axis 46 and is offset below the detector assembly 42.

Figure 3A:
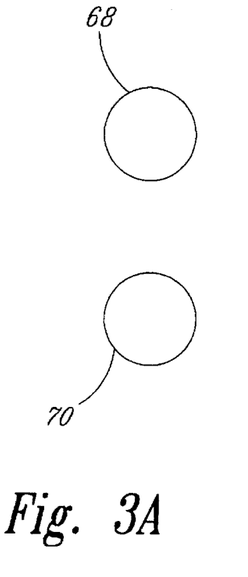
FIG. 3A is a representation of the cursor images formed by the reader of FIG. 1 at a distance less than a desired object distance from a target object.
Figure 3B:
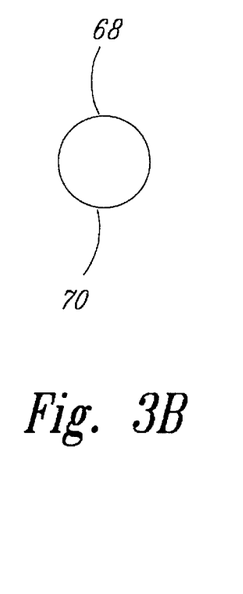
FIG. 3B is a representation of the cursor images formed by the reader of FIG. 1 at the desired object distance.
Figure 3C:
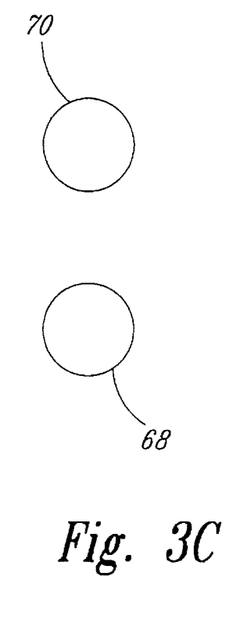
FIG. 3C is a representation of the cursor images formed by the reader of FIG. 1 at a distance greater than the desired object distance.

As shown in FIG. 3A, if the reader 40 is positioned at the distance $d_1$ from the target object 44, the cursor image 68 formed by the cursor beam 64 on the target object 44 is above the cursor image 70 formed by the cursor beam 66. As the reader 40 is moved away from the target object 44 (i.e., closer to the desired object distance $d_0$), the cursor images 68 and 70 begin to converge. When the reader 40 is positioned at the desired object distance $d_0$, the cursor images 68, 70 will overlap to form a composite image, as shown in FIG. 3B. If the reader 40 continues to move away from the target object 44, the cursor images will begin to diverge with the cursor image 68 beneath the cursor image 70. When the reader 40 is positioned at the distance $d_2$, which is greater than the desired object distance $d_0$, the cursor images 68, 70 will form the image shown in FIG. 3C.

In operation, the cursor images 68, 70 provide a simple guide to aid the user in aligning the reader with the target object 44 at the desired object distance $d_0$. The cursor light sources 60, 62 are activated by depressing the trigger switch 51 moving it from a rest position to a first position and the cursor beams 64, 66 are generated. To position the reader 40 relative to the target object 44, the user points the reader 40 toward the target object 44 and with the cursor light sources 60, 62 activated views the cursor images 68, 70 produced by the cursor beams 64, 66 on the target object 44. The user then moves the reader 40 toward or away from the target object 44 as necessary to cause the cursor images 68, 70 to converge to form the composite image of FIG. 3B, thus indicating to the user that the reader is at the desired object distance $d_0$. The desired object distance is preferably selected for the reader 40 to be a distance whereat the entire symbology to be read on the target object 44 will be within the object field 47 of the detector assembly 40 and hence captured by the reader when the illuminating optical source 49 are activated and the incident light reflected from the target object 44 is received by the detector assembly 42.

To activate the illuminating optical sources 49, and hence the detector assembly 42, the user further depresses the trigger switch 51 to a second position. This causes the illuminating optical sources 49 to flash to illuminate the target object 44 and detector assembly 42 to detect light reflected from the target object 44, thus producing a digital image of the symbology as described above.

Figure 4:
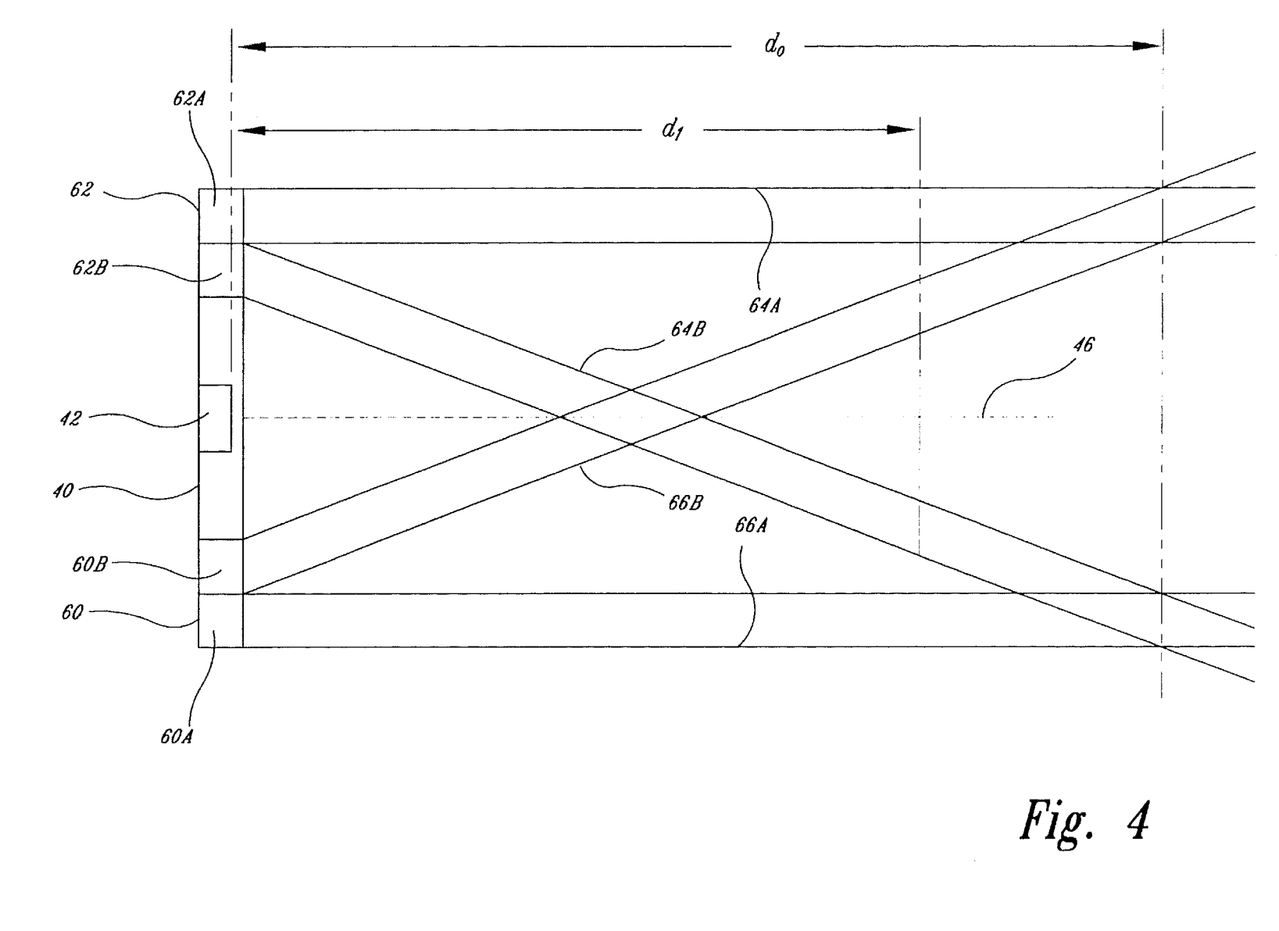
FIG. 4 is a representation of the relative positions of four cursor beams of a first alternative embodiment of the reader of FIG. 1.

In an alternative embodiments, each of the cursor light sources 60, 62 emits two cursor beams 64A, 64B, and 66A, 66B, respectively, as shown in FIG. 4. To produce two distinct beams, each of the cursor light sources 60, 62 preferably includes a pair of LEDs 60A, 60B and 62A, 62B oriented along at a direction necessary to produce the beams. Alternatively, a single LED or other light emitting source may be used in conjunction with known optical elements, such as beam splitters and mirrors to produce the respective pairs of cursor beams 64A, 64B and 66A, 66B.

The cursor light sources 60A, 60B and 62A, 62B of the embodiment of FIG. 4 are positioned such that, at the object distance $d_0$, the cursor beams 64A and 66B intersect in the upper left corner of the object field 47 and the cursor beams 66A and 64B intersect in the lower right corner of the object field 47.

Figure 5:
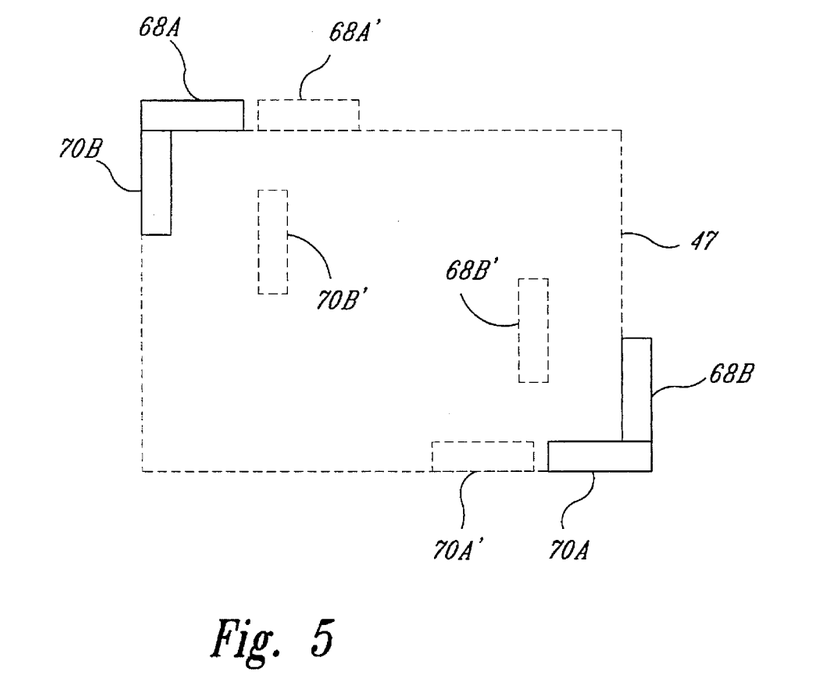
FIG. 5 is a representation of cursor images formed by the first alternative embodiment of the reader of FIG. 1 at a desired object distance, with the cursor images shown in broken line when the reader is at other than the desired object distance.

This is shown in FIG. 5, with the cursor images 68A, 68B, formed by the cursor beams 64A, 64B, respectively, and the cursor images 70A, 70B formed by the cursor beams 66A, 66B, respectively, being rectangularly shaped. Such beam shaping is well known and can be achieved using known optical elements such as an opaque sheet with a rectangularly shaped aperture therethrough. At the object distance $d_0$, the images 68A and 70B thus form an L-shaped composite image at the upper left corner of the object field 47, and the cursor images 68B and 70A form a complementary L-shaped composite image in the lower right corner of the object field 47.

In this embodiment, the L-shaped composite images advantageously align with and frame the perimeter of the object field 47 of the detector assembly 42. The composite images thus indicate a rectangular outline of the object field 47 to aid the user in alignment of the reader 40 so that the object field 47 is aligned with the target object 44 and the symbology on the target object or the portion thereof desired to be read is fully within the object field 47. In addition, the user is aided in positioning of the reader 40 at the desired object distance $d_0$.

Much as with the embodiment of FIG. 1, the cursor images 68A and 70B and the cursor images 70A and 68B diverge when the reader 40 is at a distance from the target object 44 other than the desired object distance $d_0$, as is shown by representations of the cursor images 68A, 68B, 70A and 70B using broken lines in FIG. 5. Thus, to properly position and align the reader 40 to the target object 44, the user points the reader 40 at the target object 44 and depresses the three-position switch 51 to the second position to energize the cursor optical sources 60A, 60B and 62A, 62B and form the cursor images 68A', 68B', 70A' and 70B'. The user then adjusts the distance of the reader 40 from the target object 44 until the cursor images 68A and 70B and also the cursor images 70A and 68B converge, which occurs when the reader 40 is moved to the desired object distance $d_0$. At the desired object distance $d_0$, the cursor images 68A, 68B, 70A and 70B combine to form the L-shaped composite images, thus indicating that the reader 40 is at the desired object distance $d_o$. When the cursor images 68A and 70B converge simultaneously with the cursor images 68B and 70A, the user is also assured that the image plane of the detector assembly and target object plane are parallel.

The user then makes final alignment of the reader 40 to position the L-shaped composite images such that the symbology to be read on the target object 44 is within object field 47 indicated in outline by the L-shaped composite images. The cursor images 68A, 68B, 70A and 70B thus provide a guide for a user to position the reader 40 at the object distance $d_o$ from the target object, to align the reader 40 to the symbology and make certain the symbology is fully within the object field 47. When the reader 40 is properly positioned at the desired object distance $d_o$ and aligned to the symbology, the user then depresses the three-position switch 51 to the third position to activate the flash optics to produce the digital image of the symbology within the object field 47 for decoding by the microprocessor 52.

Figure 6A:
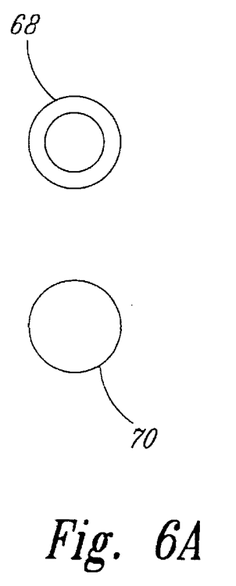
FIG. 6A is a representation of two cursor images formed by a second alternative embodiment of the reader of FIG. 1 at a distance less than a desired object distance.
Figure 6B:
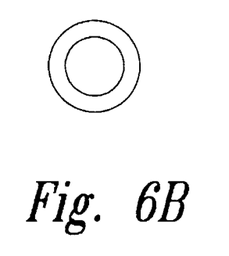
FIG. 6B is a representation of the two cursor images formed by the second alternative embodiment of the reader of FIG. 1 at the desired object distance.

Other cursor images and composite images are also within the scope of the invention. For example, as shown in FIG. 6A, the cursor image 70 may be a circle of light and the cursor image 68 may be an annular ring of light having a void in the center equivalent in diameter to the diameter of the cursor image 70. As shown in FIG. 6B, the cursor beam 64 and the cursor beam 66 intersect when the reader 40 is at the desired object distance $d_o$, and the cursor images 68 and 70 overlap to fully illuminate a contiguous circular area having a diameter equal to the outer diameter of the cursor image 68. Alternatively, the diameters of the void in the cursor image 68 may be larger than the diameter of the cursor image 70, though the composite image in such a case would not necessarily be contiguous.

Figure 7:
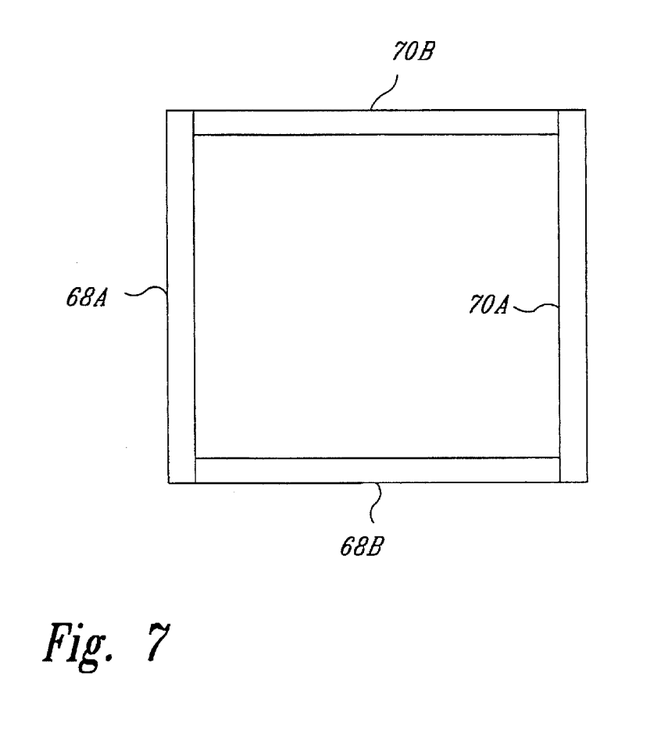
FIG. 7 is a representation of the cursor images formed by a third alternative embodiment of the reader of FIG. 1 at a desired object distance.

In another alternative embodiment, shown in FIG. 7, each of the cursor images 68A, 68B, 70A, and 70B is an elongated rectangle. When the reader 40 is at the desired object distance $d_0$ from the target object 44, the four cursor images 68A, 68B 70A, and 70B converge to form a continuous rectangular box outline delineating outer boundaries of the object field 47. The continuous rectangle formed by the convergence of the cursor images 68A, 68B, 70A, and 70B also indicates that the image plane of the detector assembly 42 is parallel to the target object plane, further aiding in alignment of the reader 40 to the target object 44.

Variations of the alternative embodiments may be made within the scope of the invention. For example, while the preferred embodiment of the cursor is generally circular, the shapes, such as rectangular or elliptical, may be used without departing from the scope of the invention.

Figure 8:
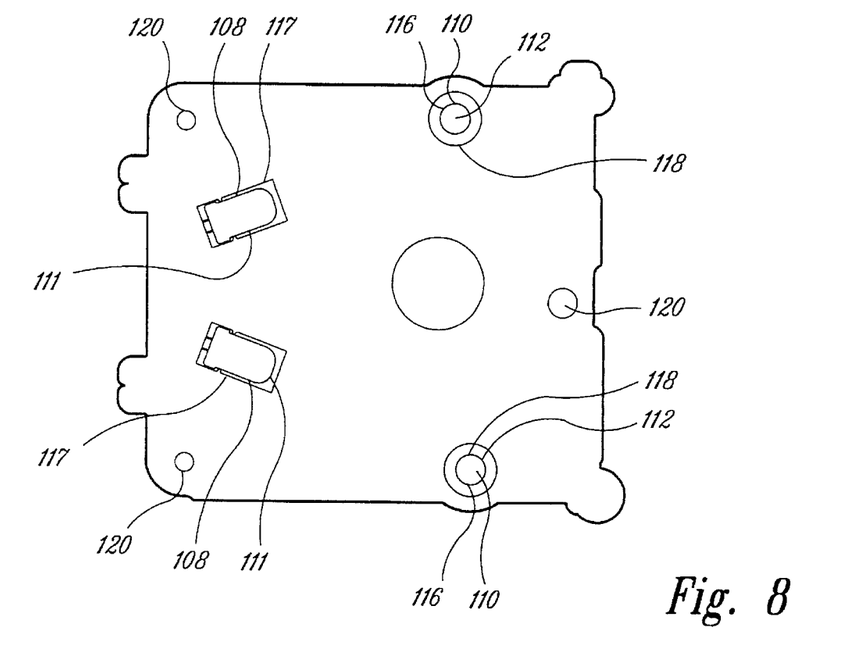
FIG. 8 is a top plan view of a platform used in an alternative embodiment of the reader of FIG. 1 showing optical sources mounted within a base and incorporating turning mirrors.
Figure 9:
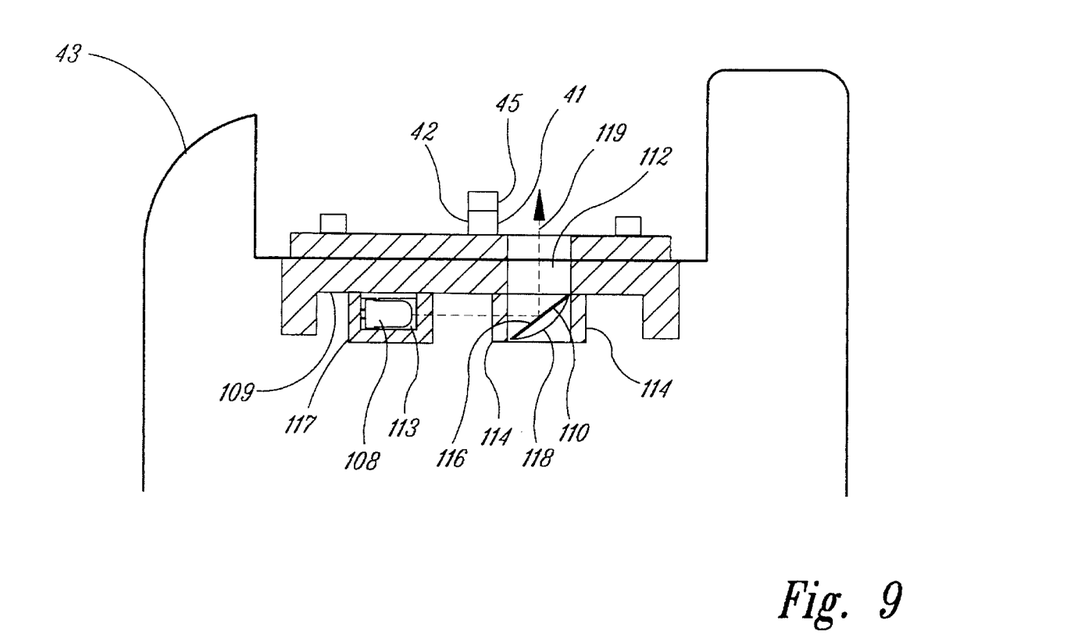
FIG. 9 is a side cross-sectional view of a symbology reader including the platform of FIG. 8.

The embodiments discussed thus far incorporate illuminating optical sources 49 mounted upon the forward facing surface 43 of the reader 40 with the cursor light sources 60, 62 being oriented to emit cursor beams 64, 66 outwardly from the reader. In the alternative embodiment of FIGS. 8 and 9, the cursor light sources are formed from two LEDs 108 and each has corresponding turning mirrors 110. The LEDs 108 and the turning mirrors 110 are mounted on a rearward facing side 109 of a mounting platform 111. The mounting platform 111 is mounted in the reader 40 with the detector assembly 42 and the illuminating optical sources 49 mounted on a forward facing side 115 of the mounting platform 111. The LEDs 108 are oriented to emit light parallel to the rearward facing side 109 of the platform 111 (as best shown in FIG. 9). The LEDs 108 are mounted to the platform 111 using formed plastic housings 117 which engage body portions 113 of the LEDs to hold them rigidly in place. Similarly, the turning mirrors 110 are glued to mounting brackets 114 formed in the platform using an adhesive.

When the LEDs 108 are energized, each emits light toward its corresponding turning mirror 110. The light strikes the turning mirrors 110 and is directed through a corresponding aperture 112 in the platform 111 and toward the target object 44 as a cursor beam 119. The angle of the cursor beam 119 is selected by choosing the angular orientation of the turning mirror 110. In the preferred orientation, an outer edge 116 of the turning mirror 110 is forward of an inner edge 118 thereof such that the light from the corresponding LED 108 is angled toward the image direction line 46, as was described in greater detail with respect to FIGS. 1 and 2. In this alternative embodiment, the LEDs 108 and the turning mirrors 110 are mounted so as to be advantageously protected against being struck by objects external to the reader 40. Preferably, the cursor beams 119 are shaped by masking a portion of the turning mirrors 110, such that only the desired portion of the light from the LEDs 108 is reflected. Alternatively, the cursor beams 119 may be shaped by optical elements such as apertures and/or lenses positioned in the optical path.

Figure 10:
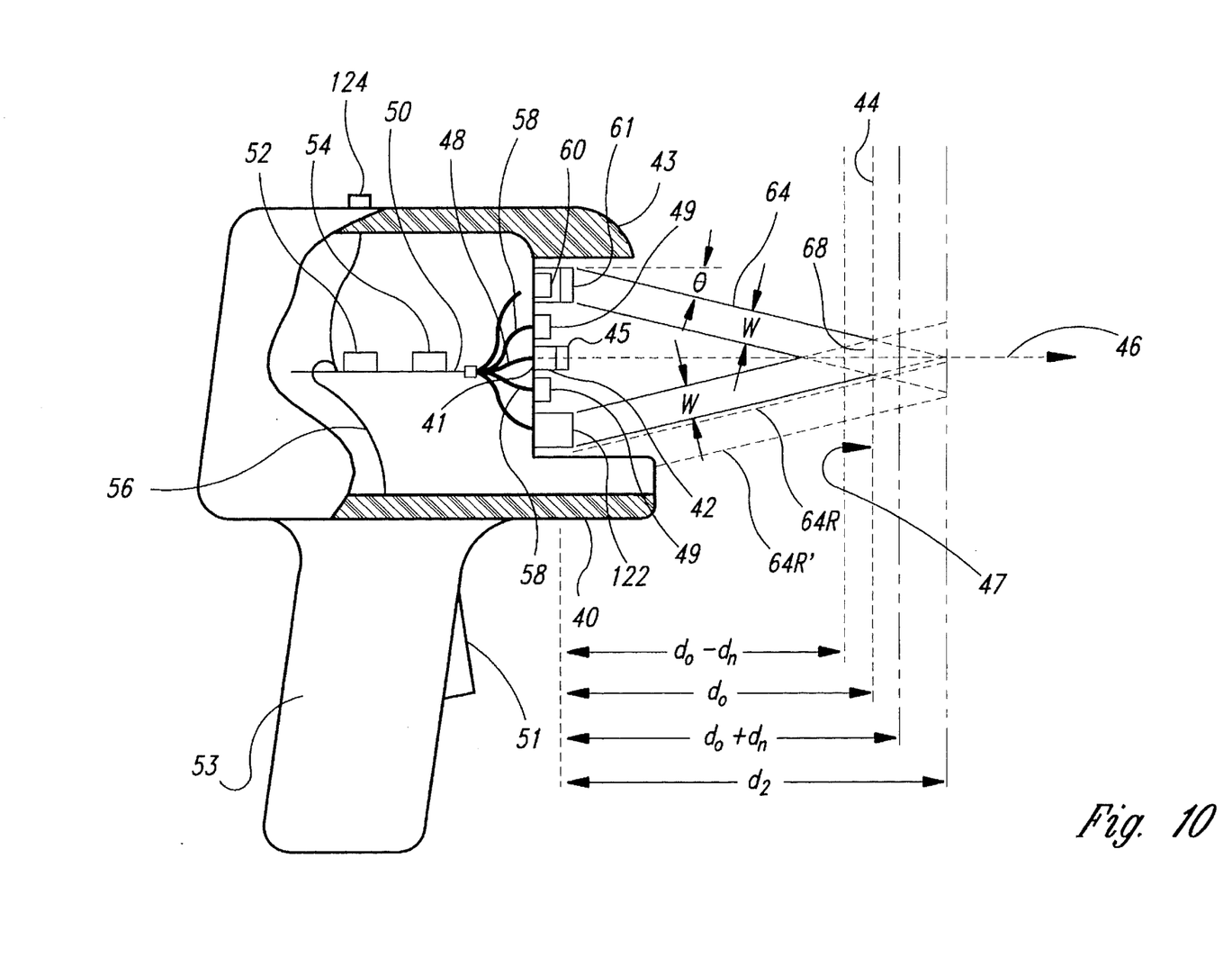
FIG. 10 is a schematic right side, cross-sectional view of a fourth alternative embodiment of a symbology reader according to the present invention.

In an alternative embodiment, shown in FIG. 10, the light source 62 of the device of FIG. 1 is replaced with an optical detector 122. Because only a single light source 60 remains, only a single cursor beam 64 will be directed toward the target object 44 at angle θ from the optical axis 46. A visible light source is preferred, as it will form a cursor image 68 on the target object 44 to aid in alignment of the reader 40 to a symbology. However, as will be discussed hereinafter, it is not necessary that the cursor beam 64 be a visible cursor beam, so long as its wavelength is in a range detectable by the detector 122.

Because only a single cursor beam 64 is emitted, only a single cursor image 68 will be formed on the target object 44. The cursor beam 64 is reflected toward the symbology reader 40 forming a reflected cursor beam 64R. The detector 122 is positioned so that when the target object 44 is at the desired object distance $d_0$, the return cursor beam 64R will be incident upon the detector 122. In response to the incident reflected cursor beam 64R the detector 122 generates an electrical signal which is transmitted by a cable 123 to the microprocessor 52 and conventional electronics 54. In response to the electrical signal from the detector 122, the microprocessor 52 and conventional electronics 54 energize a visible indicator light 124 to provide a visible indication to a user that the reader 40 is positioned at the desired object distance $d_0$. Other types of indicators, such as an acoustical element producing an audible indication, such as a beep, may be used as an alternative.

When the reader 40 is at a distance $d_2$ greater than the desired object distance $d_0$, the cursor beam 64 strikes the target object 44 below the optical axis 46 and the reflected cursor beam 64R' (shown in broken lines) returns toward the reader but does not strike the detector 122. Because the detector does not receive the reflected cursor beam 64R', it produces no electrical signals and thus no visible indication to the user is produced by the indicator 124.

Because the cursor beam 64 and the reflected cursor beam 64R have a finite beam width W, light from the cursor beam 64 which is reflected toward the reader 40 will impinge upon the detector 122, even when the reader is slightly offset from the desired object distance $d_0$. It can be seen that the distance the reader can be offset from the desired object distance $d_0$ and still permit light from the light source 60 reflected from the target object 44 to impinge upon the detector 122, is an easily determinable function of the beam width W of the cursor beam 64 and the angle θ at which the cursor beam 64 is offset from the optical axis 46.

In this embodiment, the width of the cursor beam 64 is selected such that the distance at which the reflected cursor beam 64' no longer strikes the detector 122 is approximately one half of the depth of field $2d_n$ such that indicator 124 will remain lit from the distance $d_0-d_n$ to the distance $d_0+d_n$. The indicator 124 will thus be lit when the reader 40 is within the depth of field $2d_n$ of the detector assembly 42 as discussed above with respect to FIG. 2.

Figure 11:
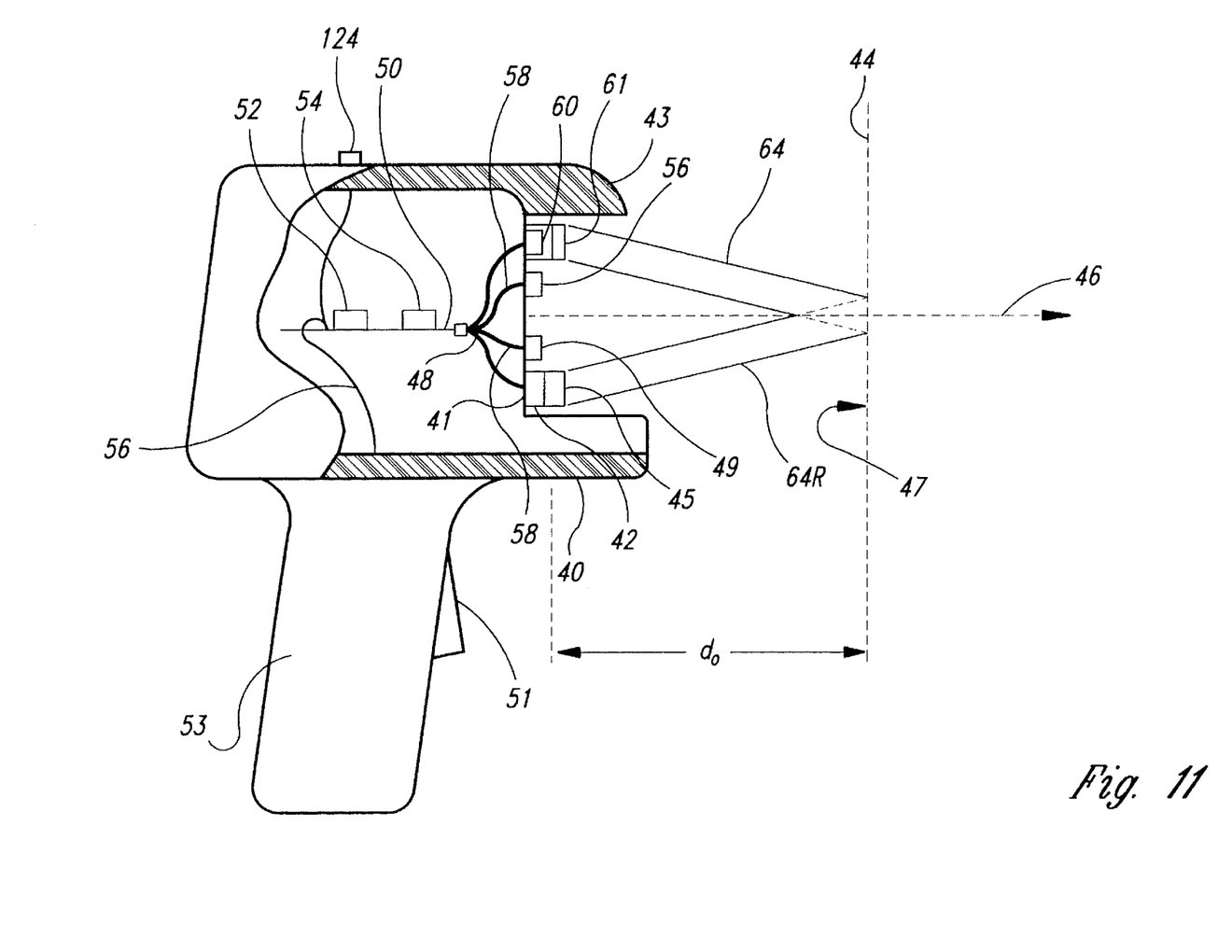
FIG. 11 is a schematic right side, cross-sectional view of a fifth alternative embodiment of a symbology reader according to the present invention.

In another alternative embodiment shown in FIG. 11, the detector assembly 42 is used to detect the reflected cursor beam 64R, rather than the separate detector 122 of the embodiment of FIG. 10. In the embodiment of FIG. 11, the detector assembly 42 is offset from the center of the reader 40 and is directed at a slight angle from the optical axis 46.

The light source 60 produces the cursor beam 64, as in the previous embodiments, and a reflected cursor beam 64R is reflected from the target object 42 toward the symbology reader 40. In this embodiment, the cursor beam 64 is aligned such that, when the symbology reader 40 is at the desired object distance $d_0$, the reflected cursor beam 64R impinges upon the detector assembly 42. The detector assembly 42 detects the light and generates an electrical signal along the cable 48 and a visible indication of alignment is produced at the indicator 124 as in the embodiment of FIG. 10.

It will be understood by those of ordinary skill in the art that numerous modifications may be made to the inventive features described herein. For example, the four cursor beam system of FIG. 5 may be extended to an eight cursor beam system using known optical techniques to form four L-shaped composite images, each having two cursor images and being positioned at a different corner of the object field 47, to more clearly outline the object field. Similarly, the cursor images delineating the center of the object field, as described with respect to FIGS. 3A, 3B, and 3C may be elongated rectangles at fixed angles relative to each other. The composite image formed at the object distance would then be a symbol recognizable by a user, such as a "+" or an "X." Also, shapes, such as a pair of opposed symbols ">" and "<" may be used as cursor images. At distances greater than the desired object distance $d_0$ these symbols are separated images, either pointing toward each other "><" or away from each other "<>". At the object distance $d_0$ the symbols combine to form an "X".

It will be appreciated that, although specific embodiments of the invention has been described herein for purposes of illustration, various modifications may be made without departing from the spirit and scope of the invention. Accordingly, the invention is not limited except as by the appended claims.

We claim:

1. A symbology reader for reading a symbology having a plurality of areas of different reflectance, the symbology being on a target object, comprising:

a housing;

an optical detector assembly fixed to the housing and having an optical axis and detecting light reflected from the target object positioned along the optical axis, the reader being movable toward and away from the target object along the optical axis to change the distance between the detector assembly and the target object, the detector assembly having a fixed object distance from the detector assembly for reading of the symbology;

a first light source fixed to the housing and configured to produce a visible first cursor beam directed along a first optical path in non-parallel angular orientation relative to the optical axis and directed toward the target object at or proximate the symbology, the first cursor beam forming a first cursor image on the target object having a first predetermined shape;

a second light source fixed to the housing and configured to produce a visible second cursor beam directed along a second fixed optical path different from the first fixed optical path and directed toward the target object at or proximate the symbology, the second light source being positioned laterally offset from the first light source, the second cursor beam forming a second cursor image on the target object having a second predetermined shape, the first and second fixed optical paths being selected such that when the reader is moved to position the detector assembly with the target object at the selected object distance from the detector assembly, the first and second cursor images form a visibly recognizable composite image on the target object indicative of the positioning of the detector assembly with the target object at the selected object distance, and when the reader is moved to position the detector assembly at other than the selected object distance the composite image is not formed on the target object; and first and second beam shaping optical elements operative to shape the first and second cursor beams, respectively, to form the first and second cursor images with the first and second predetermined shapes, the first predetermined shape of the first cursor image being recognizably different from the second predetermined shape of the second cursor image.

2. The symbology reader of claim 1, further including a reader housing and wherein the first and second light sources comprise LEDs mounted within the reader housing.

3. The symbology reader of claim 1 wherein the first and second beam shaping optical elements produce a geometric shape as the first and second predetermined shapes.

4. The symbology reader of claim 1 wherein the first and second beam shaping optical elements each include an opaque element having an aperture therethrough, the aperture being defined by sidewalls corresponding to the first or second predetermined shape.

5. The symbology reader of claim 1 wherein the first and second optical paths are directed to form the composite image when the target object is at the selected object distance as the first cursor image overlapping the second cursor image.

6. The symbology reader of claim 1 wherein the first and second optical paths are directed to form the composite image when the target object is at the selected object distance as the first cursor image touching the second cursor image.

7. A symbology reader for reading a symbology having a plurality of areas of different reflectance, the symbology being on a target object, comprising:

an optical detector assembly having an optical axis and detecting light reflected from the target object positioned along the optical axis, the reader being movable toward and away from the target object along the optical axis to change the distance between the detector assembly and the target object, the detector assembly having a selected fixed object distance from the detector assembly for reading of the symbology;

a first light source configured to produce a visible first cursor beam directed along a first optical path in non-parallel angular orientation relative to the optical axis, and directed toward the target object at or proximate the symbology from a fixed first location adjacent to the detector assembly, the first cursor beam forming a first cursor image on the target object; and a second light source configured to produce a visible second cursor beam directed along a second optical path different from the first optical path and directed toward the target object at or proximate the symbology from a fixed second location adjacent to the detector assembly and laterally spaced apart from the first location, the second cursor beam forming a second cursor image on the target object, the first and second optical paths being selected to intersect at the selected object distance from the detector assembly such that when the reader is moved to position the detector assembly with the target object at the selected fixed object distance from the detector assembly, the first and second cursor images form a visibly recognizable composite image on the target object indicative of the positioning of the detector assembly at the selected object distance, and when the reader is moved to position the detector assembly with the target object at other than the selected object distance the composite image is not formed on the target object.

8. A symbology reader for reading a symbology having a plurality of areas of different reflectance, the symbology being on a target object, comprising:

an optical detector assembly having an optical axis and detecting light reflected from the target object positioned along the optical axis, the reader being movable toward and away from the target object along the optical axis to change the distance between the detector assembly and the target object, the detector assembly having a selected object distance from the detector assembly for reading of the symbology;

first and second light sources oriented to produce respective visible first and second cursor beams in a plane substantially transverse to the optical axis;

a first turning mirror positioned to redirect the first cursor beam along a first optical path with a non-parallel angular orientation relative to the optical axis and directed toward the target object at or proximate the symbology, the first light source and the first mirror being configured such that the first cursor beam form a first cursor image on the target object having a first predetermined shape; and a second turning mirror positioned to redirect the second cursor beam along a second optical path different from the first optical path and directed toward the target object at or proximate the symbology, the second turning mirror being positioned laterally offset from the first turning mirror, the second light source and the second mirror being configured such that the second cursor beam forms a second cursor image on the target object having a second predetermined shape, the first and second optical paths being selected such that when the reader is moved to position the detector assembly with the target object at the selected object distance from detector assembly, the first and second cursor images form a visibly recognizable composite image on the target object indicative of the positioning of the detector assembly at the selected object distance, and when the reader is moved to position the detector assembly with the target object at other than the selected object distance the composite image is not formed on the target object.

9. The symbology reader of claim 8, further including a mounting platform having first and second apertures therethrough, wherein the detector assembly is mounted at a forward side of the mounting platform toward the target object, and the first and second light sources and the first and second turning mirrors are mounted at a rearward side of the platform, with the first and second turning mirrors oriented to direct the first and second cursor beams through the first and second apertures, respectively.

10. The symbology reader of claim 9, further including a reader housing and wherein the mounting platform is mounted within the reader housing.

11. A symbology reader for reading a symbology having a plurality of areas of different reflectance, the symbology being on a target object, comprising:

an optical detector assembly detecting light reflected from the target object, the detector assembly having an object field at a selected object distance from the detector assembly for reading of the symbology;

a first light source producing first and second cursor beams of visible light, the first and second cursor beams being directed along first and second optical paths, respectively, toward the target object to form first and second cursor images, respectively, on the target object, the first and second optical paths being in non-parallel orientation relative to each other such that the first and second cursor images form a visually recognizable first composite image on the target object only when the reader is moved to position the detector assembly with the target object at the selected object distance from the detector assembly; and a second light source producing third and fourth cursor beams of visible light, the third and fourth cursor beams being directed along third and fourth optical paths, respectively, toward the target object to form third and fourth cursor images, respectively, on the target object, the third and fourth optical paths being in non-parallel orientation relative to each other such that the third and fourth cursor images form a visually recognizable second composite image on the target object only when the reader is moved to position the detector assembly with the target object at the selected object distance from the detector assembly.

12. The symbology reader of claim 11 wherein the first and second optical paths are directed to form the first composite image at a first perimeter location of the object field of the detector assembly when the target object is at the object distance from the detector assembly, and the third and fourth optical paths are directed to form the second composite image at a second perimeter location of the object field of the detector assembly spaced apart from the first perimeter location when the target object is at the selected object distance from the detector assembly, whereby the first and second composite images can be used to guide aligning movement of the symbology reader to position the object field of the detector assembly in alignment with the symbology on the target object for reading of the symbology.

13. The symbology reader of claim 12 wherein the object field of the detector assembly is substantially rectangular in shape, and wherein the first and second optical paths are directed such that the first perimeter location of the object field at which the first composite image is formed, is a first corner of the object field, and the third and fourth optical paths are directed such that the second perimeter location of the object field at which the second composite image is formed, is a second corner of the object field diagonally located from the first corner of the object field.

14. The symbology reader of claim 13 wherein the first corner of the object field is defined by first and second transversely oriented perimeter boundaries and the second corner of the object field is defined by second and third transversely oriented perimeter boundaries, further including:

a first beam shaping optical element shaping the first cursor beam to have a predetermined first cross-sectional shape so as to form the first cursor image in substantial alignment with the first perimeter boundary of the object field when the target object is at the selected object distance from the detector assembly;

a second beam shaping optical element shaping the second cursor beam to have a predetermined second cross-sectional shape so as to form the second cursor image in substantial alignment with the second perimeter boundary of the object field when the target object is at the selected object distance from the detector assembly;

a third beam shaping optical element shaping the third cursor beam to have a predetermined third cross-sectional shape so as to form the third cursor image in substantial alignment with the third perimeter boundary of the object field when the target object is at the selected object distance from the detector assembly; and a fourth beam shaping optical element shaping the fourth cursor beam to have a predetermined fourth cross-sectional shape so as to form the fourth cursor image in substantial alignment with the fourth perimeter boundary of the object field when the target object is at the selected object distance from the detector assembly.

15. A symbology reader for reading a symbology having a plurality of areas of different reflectance, the symbology being on a target object, comprising:

an optical detector assembly detecting light reflected from the target object, the detector assembly having an object field at a fixed object distance from the detector assembly for reading of the symbology; and a light source configured to produce first, second, third and fourth cursor beams of visible light, the first, second, third and fourth cursor beams being directed along first, second, third and fourth optical paths, respectively, toward the target object to form first, second, third and fourth cursor images, respectively, on the target object, the first, second, third and fourth optical paths being in non-parallel orientation relative to each other such that the first, second, third and fourth cursor images form a visually recognizable composite image on the target object only when the reader is moved to position the detector assembly with the target object at the fixed object distance from the detector assembly, thereby indicating the positioning of the detector assembly at the fixed object distance.

16. The symbology reader of claim 15 wherein the object field of the detector assembly is substantially rectangular in shape and defined by first, second, third and fourth perimeter boundaries, and further including:

beam shaping optics forming each of the first, second, third and fourth cursor beams to a predetermined cross-sectional shape so as to form the first, second, third and fourth cursor images with an elongated shape, and wherein the first, second, third and fourth optical paths are directed to substantially align the first, second, third and fourth cursor images with the first, second, third and fourth perimeter boundaries of the object field, respectively, when the target object is at the selected object distance from the detector assembly.

17. The symbology reader of claim 16 wherein the beam shaping optics form the first, second, third and fourth cursor images in a continuous substantially rectangular box pattern on the target object having substantially the same size and location as the object field, whereby an outline of the object field is visibly delineated.

18. A method for aligning a symbology reader having a detector assembly mounted thereto to a symbology on a target object, the detector assembly having a predetermined object distance, comprising the steps of:

producing visible light with a first optical source;

forming the visible light from the first optical source into a first cursor beam;

directing the first cursor beam along a first optical path toward the target object to form a first cursor image thereon;

producing visible light with a second optical source offset from the first optical source;

forming the visible light from the second optical source into a second cursor beam;

directing the second cursor beam along a second optical path toward the target object to form a second cursor image thereon with the second optical path having a non-parallel orientation relative to the first optical path such that the first and second cursor images form a visually recognizable composite image on the target object when the target object is at the selected object distance from the detector assembly;

shaping the first and second cursor beams such that the first and second cursor images define respective geometric shapes, the geometric shape of the first cursor image being recognizably different from the geometric shape of the second cursor image; and adjusting the position of the symbology reader with respect to the target object until the first and second cursor images converge to form the composite image, thereby indicating that the detector assembly is at the selected object distance from the target object for reading of the symbology by the detector assembly.

19. The method of claim 18 wherein the first and second optical paths are angularly oriented to intersect at the fixed object distance from the detector assembly.

20. The method of claim 19 wherein the step of shaping the first cursor beam includes forming the first cursor beam such that the first cursor image is a V-shaped element and wherein the step of shaping the second cursor beam includes forming the second cursor beam such that the second cursor image is an oppositely oriented V-shaped element.

21. The method of claim 20 wherein the first and second optical paths are selected to form the composite image with an apex of the first cursor image touching an apex of the second cursor image when the target object is at the fixed object distance.

22. The method of claim 18, wherein the step of shaping each of the first and second cursor beams includes shaping each of the first and second cursor beams such that the first and second cursor images define respective geometric shapes to form the first and second cursor images with substantially identical cross-sectional shapes on the target object, and the steps of directing the first cursor beam and directing the second cursor beam include angularly orienting the first and second optical paths such that the first and second cursor images overlap to form the composite image on the target object when the target object is at the fixed object distance from the detector assembly.

23. The method of claim 18 wherein the step of shaping the first cursor beam includes forming the first cursor beam such that the first geometric shape is a first bar and wherein the step of shaping the second cursor beam includes forming the second cursor beam such that the second geometric shape is a second bar oriented at a predetermined angle relative to the first bar when the target object is at the fixed object distance from the detector assembly.

24. The method of claim 23 wherein the composite image formed when the target object at the fixed object distance is the first bar intersecting the second bar.

25. The method of claim 23 wherein the composite image formed when the target object is at the fixed object distance is the first bar touching the second bar.

26. The method of claim 18 wherein the composite image formed when the target object is at the fixed object distance is the first cursor image overlapping the second cursor image.

27. The method of claim 18 wherein the first and second optical paths are angularly oriented to intersect at the fixed object distance from the detector assembly, further including the steps of:

shaping the first cursor beam to form the first cursor image with an unilluminated central region; and shaping the second cursor beam to form the second cursor image with a size and shape to fit substantially within the unilluminated central region of the first cursor beam when the target object is at the fixed object distance from the detector assembly.

28. A method for aligning a symbology reader having a detector assembly mounted thereto to a symbology on a target object, the detector assembly having a predetermined fixed object distance and an object field, comprising the steps of:

producing a first cursor beam of visible light;

shaping the first and second cursor beams such that the first and second cursor beams form respective geometric shapes;

directing the first cursor beam along a first optical path toward the target object to form a first cursor image thereon;

producing a second cursor beam of visible light;

directing the second cursor beam along a second optical path toward the target object to form a second cursor image thereon with the second optical path having a non-parallel orientation relative to the first optical path such that the first and second cursor images form a visually recognizable first composite image on the target object when the target object is at the fixed object distance from the detector assembly;

producing a third cursor beam of visible light;

directing the third cursor beam along a third optical path toward the target object to form a third cursor image thereon;

producing a fourth cursor beam of visible light;

directing the fourth cursor beam along a fourth optical path toward the target object to form a fourth cursor image thereon with the fourth optical path having a non-parallel orientation relative to the third optical path such that the third and fourth cursor images form a visually recognizable second composite image on the target object when the target object is at the fixed object distance from the detector assembly; and adjusting the position of the symbology reader with respect to the target object until the first and second cursor images converge to form the first composite image and the third and fourth cursor images converge to form the second composite image, thereby indicating that the detector assembly is at the fixed object distance from the target object for reading of the symbology by the detector assembly.

29. The method of claim 28 wherein the first and second optical paths are selected to form the first composite image at a first perimeter location of the object field of the detector assembly when the target object is at the fixed object distance from the detector assembly, and the third and fourth optical paths are selected to form the second composite image at a second perimeter location of the object field of the detector assembly spaced apart from the first perimeter location when the target object is at the fixed object distance from the detector assembly, whereby the first and second composite images can be used to guide aligning movement of the symbology reader to position the object field of the detector assembly in alignment with the symbology on the target object for reading of the symbology.

30. The method of claim 29 for use with a detector assembly having an object field that is substantially rectangular in shape, wherein the first and second optical paths are selected such that the first perimeter location of the object field at which the first composite image is formed, is a first corner of the object field, and the third and fourth optical paths are selected such that the second perimeter location of the object field at which the second composite image is formed, is a second corner of the object field diagonally located from the first corner of the object field.

31. The method of claim 30 wherein the first corner of the object field is defined by first and second transversely oriented perimeter boundaries and the second corner of the object field is defined by second and third transversely oriented perimeter boundaries, further including the steps of:

shaping the first cursor beam to have a predetermined first cross-sectional shape so as to form the first cursor image in substantial alignment with the first perimeter boundary of the object field when the target object is at the fixed object distance from the detector assembly;

shaping the second cursor beam to have a predetermined second cross-sectional shape so as to form the second cursor image in substantial alignment with the second perimeter boundary of the object field when the target object is at the fixed object distance from the detector assembly;

shaping the third cursor beam to have a predetermined third cross-sectional shape so as to form the third cursor image in substantial alignment with the third perimeter boundary of the object field when the target object is at the fixed object distance from the detector assembly; and shaping the fourth cursor beam to have a predetermined fourth cross-sectional shape so as to form the fourth cursor image in substantial alignment with the fourth perimeter boundary of the object field when the target object is at the fixed object distance from the detector assembly.

32. The method of claim 28 for use with a detector assembly having an object field that is substantially rectangular in shape and defined by first, second, third and fourth perimeter boundaries, further including the step of shaping each of the first, second, third and fourth cursor beams to a predetermined cross-sectional shape so as to form the first, second, third and fourth cursor images with an elongated shape, and wherein the first, second, third and fourth optical paths are selected to substantially align the first, second, third and fourth cursor images with the first, second, third and fourth perimeter boundaries of the object field, respectively, when the target object is at the fixed object distance from the detector assembly.

33. The method of claim 32 wherein the first, second, third and fourth cursor images form a continuous substantially rectangular box pattern on the target object having substantially the same size and location as the object field, whereby an outline of the object field is visibly delineated.

* * * * *